(12) United States Patent
Freeman et al.

(10) Patent No.: US 6,630,638 B1
(45) Date of Patent: Oct. 7, 2003

(54) DEAD TANK DRAWOUT BREAKERS

(75) Inventors: Willie B. Freeman, Irwin, PA (US); Aftab H. Khan, Export, PA (US); Thomas D. Shively, Pleasant Unity, PA (US)

(73) Assignee: ABB Inc., Raleigh, NC (US)

( * ) Notice: Subject to any disclaimer, the term of this patent is extended or adjusted under 35 U.S.C. 154(b) by 0 days.

(21) Appl. No.: 09/578,883

(22) Filed: May 26, 2000

(51) Int. Cl.⁷ ............................................. H02B 11/00
(52) U.S. Cl. .................................. 200/50.21; 361/605
(58) Field of Search ........................ 200/50.21–50.25; 361/605–615

(56) References Cited

U.S. PATENT DOCUMENTS

| | | | |
|---|---|---|---|
| 1,768,535 A | * 7/1930 | Ainsworth | 175/198 |
| 1,929,293 A | * 10/1933 | Saint-Germain | 175/198 |
| 2,218,554 A | * 10/1940 | Rossman | 175/198 |
| 3,008,016 A | * 11/1961 | Mercier | 200/50 |
| 3,080,459 A | * 3/1963 | Delaney | 200/50 |
| 3,171,008 A | * 2/1965 | Phillips | 200/169 |
| 3,562,593 A | 2/1971 | Bould | 317/103 |
| 3,603,752 A | * 9/1971 | Frink | 200/148 R |
| 3,735,065 A | 5/1973 | Brandt, Jr. et al. | 200/50 |
| 3,920,938 A | 11/1975 | Netzel et al. | 200/50 |
| 3,958,156 A | 5/1976 | Tjebben | 200/144 B |
| 3,973,096 A | 8/1976 | Burgoon | 200/144 B |
| 4,017,698 A | 4/1977 | Kuhn et al. | 200/50 AA |
| 4,020,301 A | 4/1977 | Ericson et al. | 200/50 AA |
| RE29,381 E | 8/1977 | Caton | 361/337 |
| 4,442,329 A | 4/1984 | Gray et al. | 200/148 B |
| 4,950,854 A | 8/1990 | Green | 200/144 B |
| 5,478,980 A | 12/1995 | Freeman et al. | 218/59 |
| 5,483,210 A | 1/1996 | Otterberg et al. | 335/18 |
| 5,495,084 A | 2/1996 | Meyer et al. | 218/43 |
| 5,504,289 A | 4/1996 | Smith et al. | 200/400 |
| 5,578,804 A | 11/1996 | Berger et al. | 218/43 |
| 5,629,869 A | 5/1997 | Johnson et al. | 364/551.01 |
| 5,648,888 A | 7/1997 | LeFrancois et al. | 361/603 |
| 5,889,248 A | 3/1999 | Plettner et al. | 218/7 |

OTHER PUBLICATIONS

Specifications, "PV System 27™ 27kV Metal–Clad Switchgear," Powell Electrical Mfg Co., 1997. [Page last modified on Jun. 17, 1999].

Synopsis # 13, Johnson, Gary B., "Field–Management Technologies," EMF Engineering Review Symposium, Apr. 22, 1998, pp. 13–1—13–6.

ABB Transmit Oy, Distribution Transformers, Website: http://www.elecworld.com/cir_brk.html (2 pages), printout Jan. 17, 2000.

Electrical World, Inc. Online Information, Electrical World Switches, Website: http://www.elecworld.com/switches.html, (1 page) printout Jan. 17, 2000.

LaPrairie Electrical Products, Substation Connectors, http://www.spectrant.ca/connectors/sub.htm, (1 page) printout Jan. 17, 2000.

Danger Zone: The Substation Fence, College Station Texas, Website: http://www.cstx.gov/cbook/power/danger.htm, printout Jan. 17, 2000.

Electrical World, Inc., Electrical World Substations, Website: http://www.elecworld.com/subst.html, (1 page) printout Jan. 17, 2000.

(List continued on next page.)

*Primary Examiner*—Michael Friedhofer
(74) *Attorney, Agent, or Firm*—Woodcock Washburn LLP (57) ABSTRACT

A switching device facilitates access, repair, maintenance of the device during operation in a electrical substation, and minimizes real estate and equipment in the electrical substations. The device integrates air disconnect switches, preferably mounted atop each bushing. The device further comprises wheels, a removable rail system, and a staggered height arrangement of the switches on the bushing to allow translation of the device from a first position to an electrically isolated second position.

28 Claims, 8 Drawing Sheets

OTHER PUBLICATIONS

High Voltage Products & Substations, Website: http://www.abb.com/glob.../
c6daaf7ecc864dbc412567e5004f71f8?OpenDocument&v=d&e=u, printout (1 page) Nov. 19, 1999.

Superwinch, Winching Tips, Website: http://www.superwinch.com/tips.htm/, 1996 Superwinch Inc. (3 pages) printout Jan. 28, 2000.

Electrical World, Inc. Electrical World Circuit Breakers, *http://www.elecworld.com/circ_brk.htm.*, (1 page), printout Jan. 17, 2000.

Johnson, D. et al., "The Seismic Design and Testing of ABB Dead Tank Circuit Breakers," Copyright 1992, ABB Power T&D Company Inc., pp. 1–8.

D. Johnson et al., "New Technology in $SF_6$ Breakers," ABB Power T&D Company Inc., 1989.

Freeman, Willie B., et al., "Applications of New Insulator Technologies on Circuit Breaker Bushings: an OEM's Perspective," *Insulator 2000*, Nov. 1999, pp. 1–.

Freeman, Willie B. et al., "Development of High Interrupting Current and EHV Circuit Breakers," 1999 ABB Electric Utility Conference, Mar. 22–30, 1999, pp. 1–10.

D.S. Johnson et al., "Development of the Type 145 PM Self–Blast Circuit Breaker," 1991 Doble Client Conference, Boston, Apr. 9, 1991, Asea Brown Boveri, pp. 1–10.

Descriptive Bulletin 33–220A. "Type PM Dead Tank: SF6 Power Circuit Breakers 362 Through 550 kV," ABB Power T&D Company Inc., Apr. 1991.

Descriptive Bulletin 32–110A, "Vertical–Break Group–Operated Outdoor Disconnec Switches," ABB Power T&D Company Inc., Jul. 1991, pp. 1–12.

Descriptive Bulletin 33–200A, "Type PM $SF_6$ Power Circuit Breaker," ABB Power T&D Company Inc, Nov. 1991.

Descriptive Bulletin, 33–400A, "Type ELF Live Tank: $SF_6$ Power Circuit Breakers 242 Through 800kV," ABB Power T&D Company Inc., May 1992.

Descriptive Bulletin, 33–230–A, "Type PMR & PMRI Circuit Breaker," ABB Powe T&D Company Inc., Jun. 1995.

Descriptive Bulletin 33–210–A, "Type PM Circuit Breaker," ABB Power T&D Company Inc, Mar. 1997.

Descriptive Bulletin, 33–231A, "Type PMG & PME Circuit Breaker 242kV through 362 kV," ABB Power T&D Company Inc., Aug. 1998.

Descriptive Bulletin, 32–111A, "Type TTTR8," ABB Power T&D Company Inc., Jan. 1999.

Descriptive Bulletin, 33–502A, "Type CSL Circuit Switcher: 146 kV & 170 kV," ABB Power T&D Company Inc., Feb. 1999.

* cited by examiner

DEAD TANK DRAWOUT BREAKERS

FIELD OF THE INVENTION

The present invention relates generally to electrical switching devices. More particularly, the present invention relates to electrical switching devices that have an architecture that facilitates access, maintenance, and repair to the device and reduces substation equipment and real estate.

BACKGROUND OF THE INVENTION

A high voltage circuit breaker is a device used in the transmission and distribution of three phase electrical energy. When a sensor or protective relay detects a fault or other system disturbance on the protected circuit, the circuit breaker operates to physically separate current-carrying contacts in each of the three phases by opening the circuit to prevent the continued flow of current. In addition to its primary function of fault current interruption, a circuit breaker is capable of load current switching. A circuit switcher and load break switch are other types of switching device. As used herein, the expression "switching device" encompasses circuit breakers, circuit switches, dead tank breakers, live tank breakers, load break switches, reclosers, and any other type of electrical switch.

The major components of a circuit breaker or recloser include the interrupters, which function to open and close one or more sets of current carrying contacts housed therein; the operating mechanism, which provides the energy necessary to open or close the contacts; the arcing control mechanism and interrupting media, which interrupt current and create an open condition in the protected circuit; one or more tanks for housing the interrupters; and the bushings, which carry the high voltage electrical energy from the protected circuit into and out of the tank(s) (in a dead tank breaker). In addition, a mechanical linkage connects the interrupters and the operating mechanism.

Circuit breakers can differ in the overall configuration of these components. However, the operation of most circuit breakers is substantially the same. For example, a circuit breaker may include a single tank assembly which houses all of the interrupters. U.S. Pat. No. 4,442,329, Apr. 10, 1984, "Dead Tank Housing for High Voltage Circuit Breaker Employing Puffer Interrupters," discloses an example of the single tank configuration and is incorporated herein in its entirety by reference. Alternatively, a separate tank for each interrupter may be provided in a multiple tank configuration. An example of a prior art, multiple tank circuit breaker is depicted in FIGS. 1, 2, 3, and 4. Circuit breakers of this type can accommodate 72 kV, 145 kV, 242 kV, and 362 kV power sources.

Figure 1:
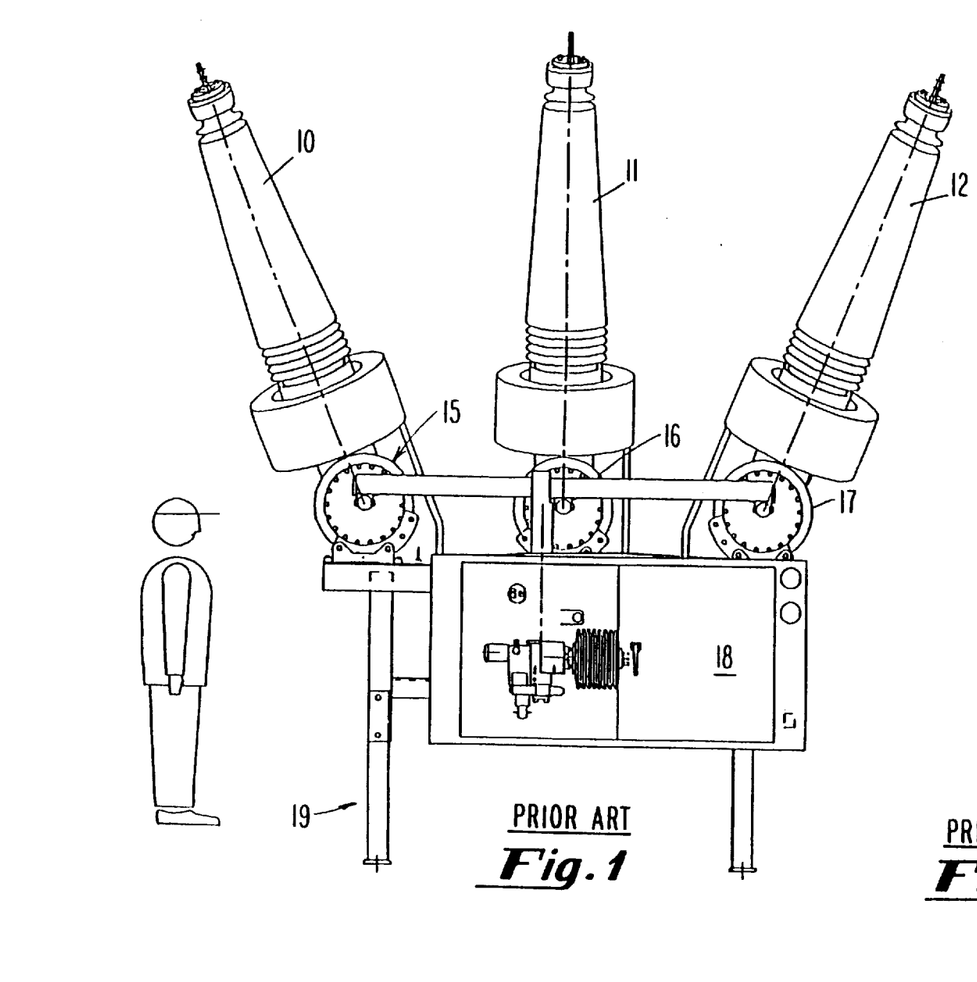
FIG. 1 shows a typical three-pole circuit breaker of the prior art.

The circuit breaker shown in FIG. 1 is commonly referred to as a "dead tank" because it is at ground potential. FIG. 1 provides a front view of a three phase or three-pole circuit breaker having three entrance bushing insulators, 10, 11, and 12, that correspond to each respective phase. The bushing insulators may be comprised of porcelain, composite, or a hardened synthetic rubber sufficient to withstand seismic stresses as well as stresses due to the opening and closing of the interrupter contacts within the device. In high voltage circuit breakers, the bushings for each phase are often mounted so that their ends have a greater spacing than their bases to avoid breakdown between the exposed conductive ends of the bushings.

The circuit breaker is comprised of three horizontal puffer interrupter assemblies enclosed in cylindrical tanks 15, 16, and 17. Current transformer assemblies 20 and 21 (referring to FIG. 2), which comprise one or more current transformers and their exterior housings, are located underneath the bushing insulators on the exterior of the breaker to facilitate their replacement in the field. Current transformers 20 and 21 measure the outgoing current.

Figure 2:
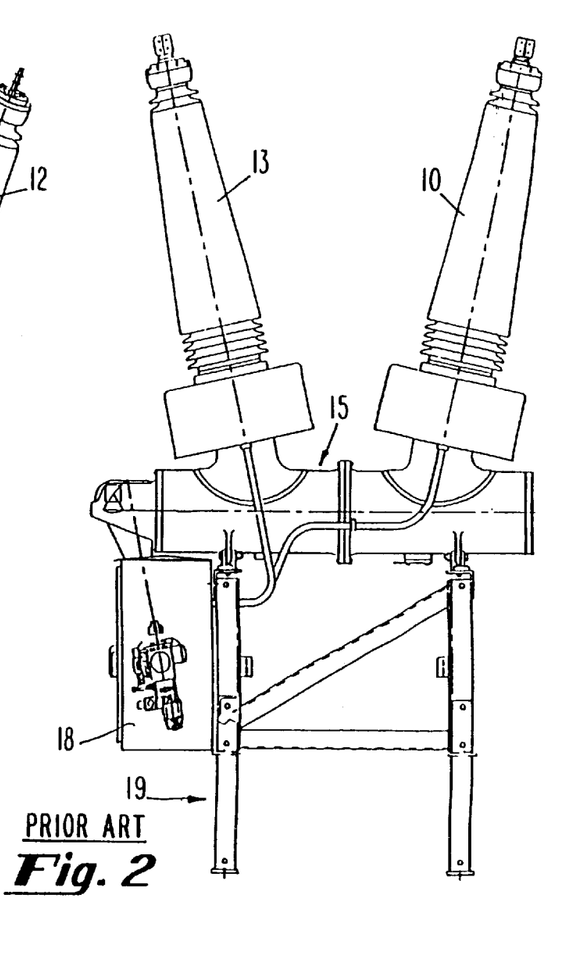
FIG. 2 provides a side view of the three-pole circuit breaker of FIG. 1.

FIG. 2 provides a side view of the three-pole circuit breaker of FIG. 1 that shows the corresponding exit bushing insulator, 13, of the interrupter assembly housed in tank 15. FIG. 2 illustrates how entrance bushing insulator 10 and exit bushing insulator 13 is associated with tank 15. The entrance and exit bushing insulators for the interrupters in tanks 16 and 17 (not shown in FIG. 2) are arranged in a similar fashion.

Referring to FIG. 1 and FIG. 2, the three interrupter tank assemblies are mounted on a common support frame 19. The operating mechanism that provides the necessary operating forces for opening and closing the interrupter contacts is contained within an operating mechanism housing or cabinet 18. The operating mechanism is typically mechanically coupled to each of the interrupter assemblies through a common linkage such as a drive cam. The operating mechanisms can be, but are not limited to, compressible springs, solenoids, hydraulic, or pneumatic-based mechanisms.

Figure 3:
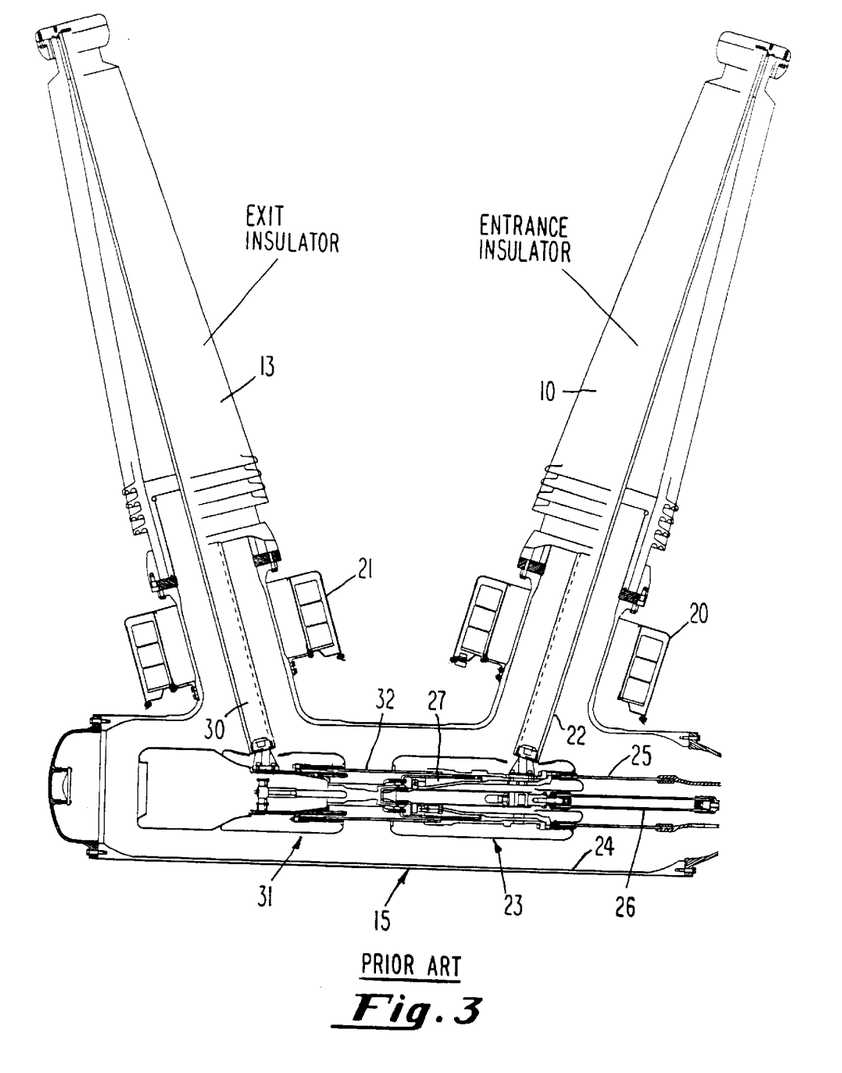
FIG. 3 is a partial, cross-sectional view of the circuit interrupter assembly housed of FIG. 1 with its contacts open.

FIG. 3 is a partial, cross-sectional view of the interrupter assembly housed within cylindrical tank 15 and shown in FIG. 1 and FIG. 2. A typical circuit interrupter is comprised of stationary and movable contact assemblies 31 and 23, respectively. Entrance insulator bushing 10 houses a central conductor 22 which supports movable contact assembly 23 within conductive tank 24. Movable contact assembly 23 is affixed to an insulator tube 25 through which a linearly operating rod 26 extends. Rod 26 operates movable contact 27 between its open and closed position in a well-known fashion.

Exit insulator bushing 13 houses a central conductor 30 which is connected to the stationary contact assembly 31 and is also supported within conductive tank 24. An insulator tube 32 extends between the stationary contact assembly 31 and the movable contact assembly 23.

The interior volume of tank 24, as well as the entrance and exit insulating bushings 10 and 13, are preferably filled with an inert, electrically insulating gas such as $SF_6$. The electrically insulating gas fulfills many purposes. The arcing contacts within both the stationary and movable contact assemblies are subject to arcing or corona discharge when they are opened or closed. Such arcing can cause the contacts to erode and disintegrate over time. Current interruption must occur at a zero current point of the current waveshape. This requires the interrupter medium to change from a good conducting medium to a good insulator or non-conducting medium to prevent current flow from continuing. Therefore, a known practice (used in a "puffer" interrupter) is to fill a cavity of the interrupter with an inert, electrically insulating gas that quenches the arc formed. During operation of the contacts in assemblies 23 and 31, a piston, which moves with the movable contact in assembly 23, compresses the gas and forces it the compressed gas between the separating contacts and toward the arc, thereby cooling and extinguishing it. The gas also acts as an insulator between conductive parts within housing 15 and the wall of tank 24.

Figure 4:
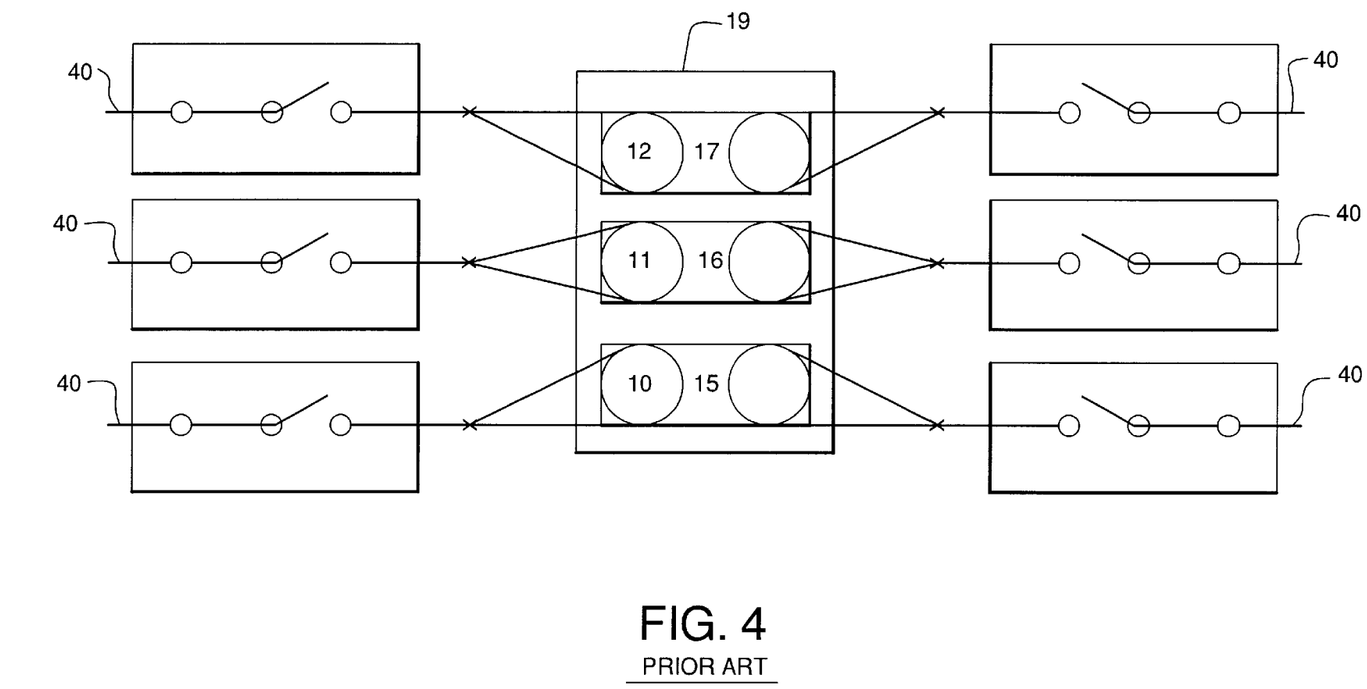
FIG. 4 provides a top view of a typical installation of the circuit breaker of FIG. 1 in an electrical substation.

Circuit breakers can switch various devices in an electric utility system. Primarily, these devices include transmission lines, transformers, shunt capacitor banks, and shunt reactors within an electrical substation, power distribution substation, or power transformer and distribution substation. The electrical substation converts the high voltage power carried by long-distance transmission lines into lower distribution voltage that services homes and businesses. FIG. 4 provides a top view of the circuit breaker of FIG. 1 as it is commonly installed within an exterior electrical substation. These substations generally cover a large surface area and are not aesthetically pleasing. Given their design, these substations require a great deal of maintenance due to their continuous exposure to climatic and seismic events.

As FIG. 4 shows, the conductive ends of the bushings are connected to a series of individual air disconnect switches or blades 40 that relate and connect each phase of the circuit breaker to the overhead, electrical substation bus (not shown in FIG. 4). Air disconnect switches 40, that relate to incoming and outgoing voltage, are each independently supported on electrically grounded frames. This arrangement requires electrical clearance on both sides of the circuit breaker to allow sufficient electrical isolation during maintenance and repair. In general, conventional disconnect switches are located on both sides of the breaker and are larger than the breaker. Thus, the disconnect switches occupy a larger surface area, or foot print, than the breaker itself. This arrangement may become impractical and unsafe if space in the electric utility system is limited. Moreover, more intensive maintenance and repair tasks, or a complete over-haul of the switching device, may be more difficult due to the limited real estate in the electric utility system.

SUMMARY OF THE INVENTION

The present invention fulfills these needs in the art by providing electrical switching devices that conserve real estate and reduce equipment within an electrical substation. In many instances, conventional breaker and disconnect switch assemblies occupy a surface area or footprint about three times greater than that of the present invention. The present invention also reduces maintenance and repair costs and time by facilitating access to the switching device and its sub-components.

According to the invention, the electrical switching device comprises a frame that supports a plurality of legs that terminate with wheels, one or more tanks that house the circuit interrupter assembly, and bushings. The bushings extend outwardly from the circuit interrupter tank and terminate with a conductive end. In preferred embodiments, the frame further comprises a locking device on the wheels and a winch. One or more disconnect switches connect the conductive ends of the bushings to incoming and outgoing power sources within the electrical system such as an overhead bus. In preferred embodiments, the disconnect switches are mounted onto the switching device rather than the substation power sources. The height of these disconnect switches, or the conductive ends of the bushing if the switches are mounted onto the bus, are staggered with respect to each other.

In preferred embodiments, a rail system or a pair of removable beams is used to translate the device from a first position to a second position for maintenance. The locking devices on the wheels of the switching device, such as foundation clamps in preferred embodiments, are disengaged to allow translation of the device from its fixed or first position. The wheels on the switching device engage the rails and the switching device is translated across the rails by a winch or other means to a second position. The distance between the first position and the second position is sufficient to provide adequate electrical clearance. In preferred embodiments, this distance is at least about 30 inches multiplied by a factor of 1, 2, 4, or 8 for 72 kV, 145 kV, 242 kV, or 362 kV devices, respectively. The staggered height of the disconnect switches or conductive ends of the bushings allow the device to translate from the first position and the second position without interference.

It is to be understood that both the foregoing general description and the following detailed description are exemplary and are intended to provide further explanation of the invention as claimed. The accompanying drawings are included to provide a further understanding of the invention. In the drawings, like reference characters denote similar elements throughout several views. It is to be understood that various elements of the drawings are not intended to be drawn to scale.

A more complete understanding of the present invention, as well as further features and advantages of the invention such as its application to other electrical devices within a substation or system, will be apparent from the following Detailed Description and the accompanying drawings.

Reference will now be made in detail to a presently preferred embodiment of the invention, an example of which is illustrated in the accompanying drawing.

DETAILED DESCRIPTION OF PREFERRED EMBODIMENTS

The present invention is directed to electrical switching devices. More particularly, the present invention provides electrical switching devices that minimize the real estate and equipment in an electrical substation. Moreover, electrical switching devices of the present invention reduce labor costs and equipment down-time and increase safety due to accessibility of these devices for maintenance and repair.

Figure 5:
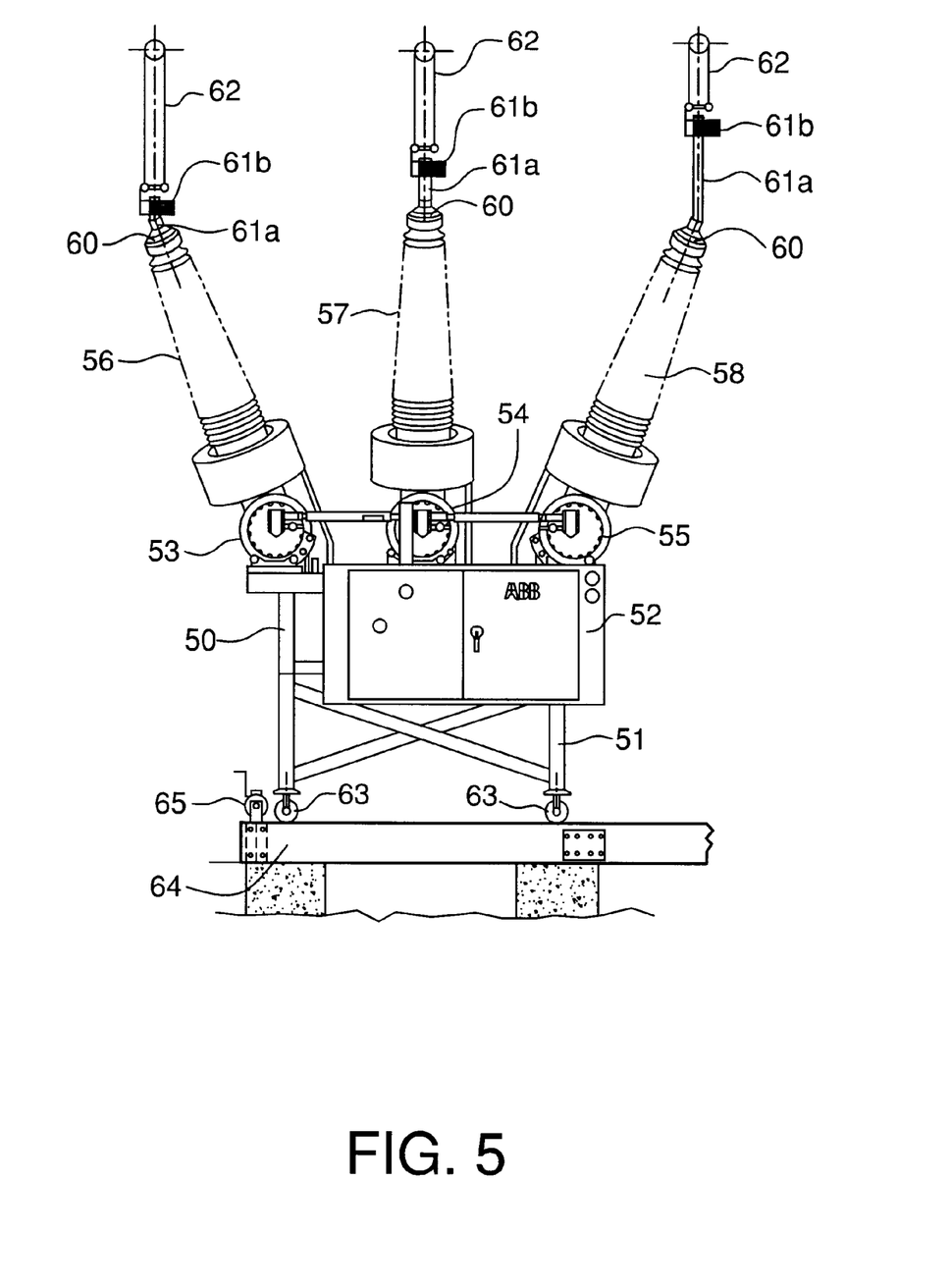
FIG. 5 provides a front view of an electrical switching device of the present invention.
Figure 6:
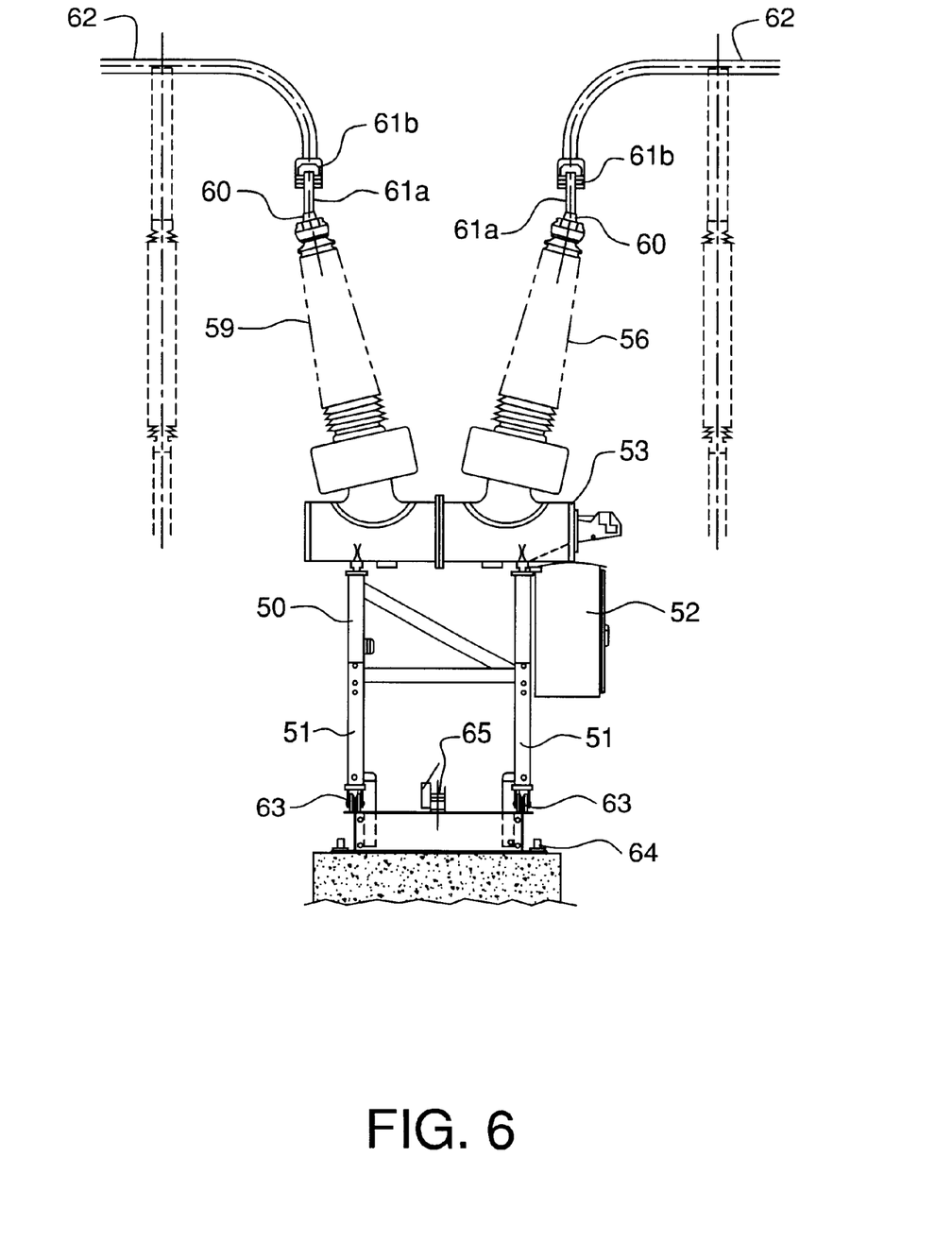
FIG. 6 provides a side view of the electrical switching device of the present invention.

FIG. 5 provides a front view of an electrical switching device of the present invention. The electrical switching device shown is a three pole or three phrase circuit breaker. It is anticipated, however, other device configurations may be made in accordance with the present invention. The device in FIG. 5 is comprised of a support frame 50 that contains one or more legs 51 and an operating mechanism 52. The support frame further supports one or more tanks 53, 54, and 55. Tanks 53 through 55 contain the circuit interrupter assemblies (not shown). One or more insulating bushings 56, 57, and 58, preferably two bushings that correspond to each phase or pole of the device, extend upwardly from the tanks. FIG. 6 provides a side view of the electrical switching device of FIG. 5. FIG. 6 shows how the entrance insulating bushing 56 and exit insulating bushing 59 relate to tank 53.

Referring to FIG. 5, the insulating bushings have a conductive tip or end 60. Air disconnect switches or switch assemblies 61 are attached directly atop the conductive ends on each bushing. Air disconnect switch 61 is further comprised of a conductive blade 61a and a contact 61b. The height of air disconnect switches 61, or length of their conductive blade 61b, are of variable or staggered height with respect to each pole or phase. The variable height of each switch assembly 61 allows the insulating bushings of each phase to have sufficient clearance as the device is moved from its fixed position or first position to a maintenance or second position. Switches 61 are connected to a rigid, installed overhead or substation bus 62.

The air disconnect switches 61 employed in the present invention are comprised of materials that are durable enough to survive extreme environmental as well as operational conditions. The switches are also resistant to high magnetic and high electrical current forces. Typical materials that may be used include high conductivity, high strength aluminum alloys that are combined with stainless steel bolts, nuts, and pins along the current path to minimize corrosion. In preferred embodiments, the air disconnect switch 61 is connected to the conductive ends of the bushing 60 or, alternatively the substation bus, by jaw contacts 61b. Jaw contacts 61b may be comprised of tinned, hard drawn reverse loop copper jaw fingers backed by stainless steel springs to improve current-carrying capability and resistance to corrosion. An example of a preferred jaw contact is the TTR8 manufactured by ABB Power T & D Company Inc. However, other disconnect switches, switch assemblies, and contacts may be used without departing from the spirit of the present invention. In preferred embodiments, the jaw contacts are mounted onto the overhead bus 62 as shown in FIG. 5 and FIG. 6. Alternatively, the contacts may be mounted onto the conductive end of the bushings. The device is disengaged from the overhead bus by opening the air disconnect switch assemblies 61 on each bushing.

Figure 7:
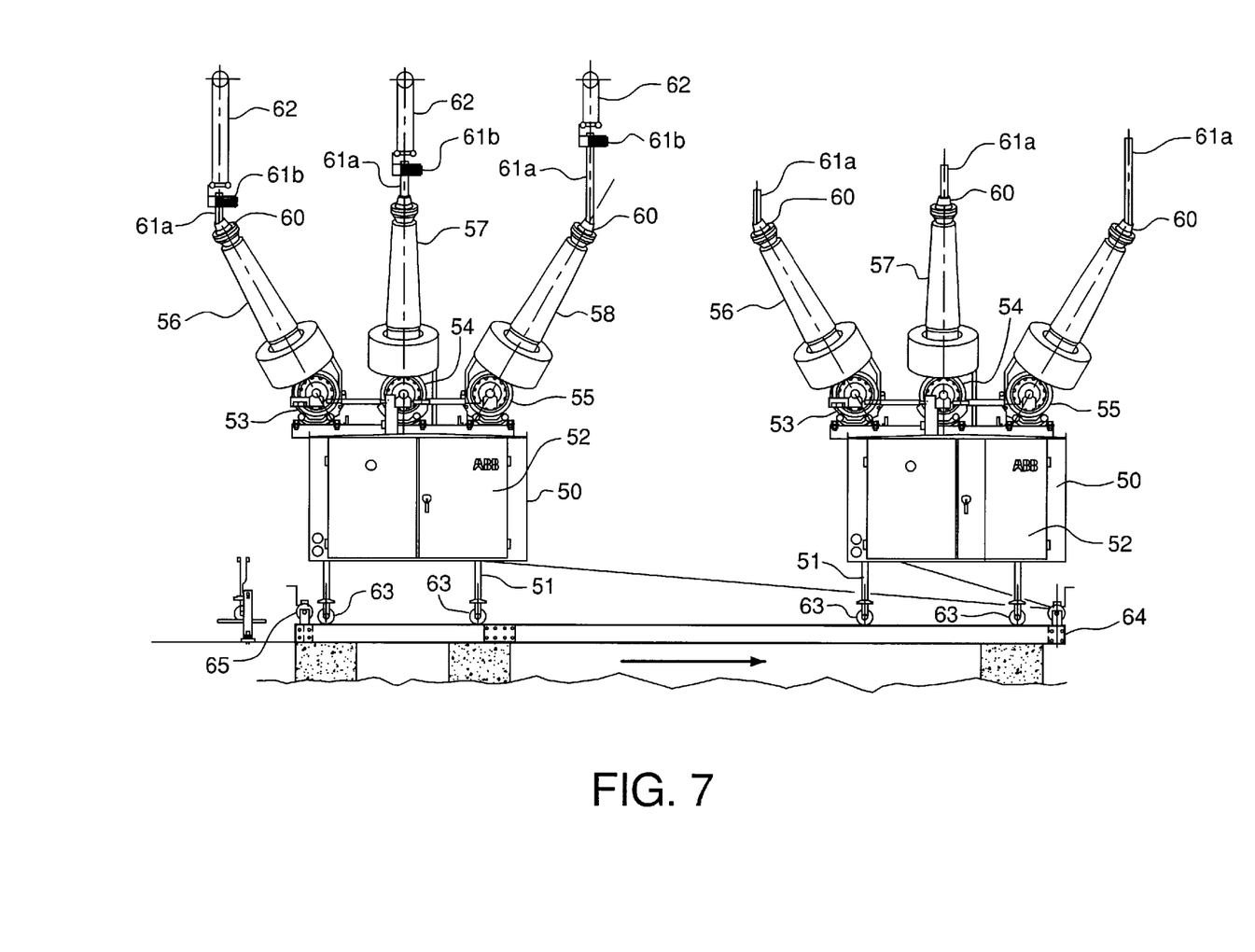
FIG. 7 shows the translation of an embodiment of the present invention from first position to second position.

FIG. 7 depicts the translation of the device from its fixed or first position to a maintenance or second position. The distance between the first position and the second position must provide sufficient electrical isolation to allow a person to safely work on the device. In preferred embodiments, this distance is at least about 30 inches multiplied by a factor, R, wherein the factor R is equal to 1, 2, 4, or 8 for 72 kV, 145 kV, 242 kV, or 362 kV devices, respectively. The translation of the device is preferably horizontal and in one direction to prevent interference of the disconnect switches 61 with the rigid overhead bus 62.

Figure 8:
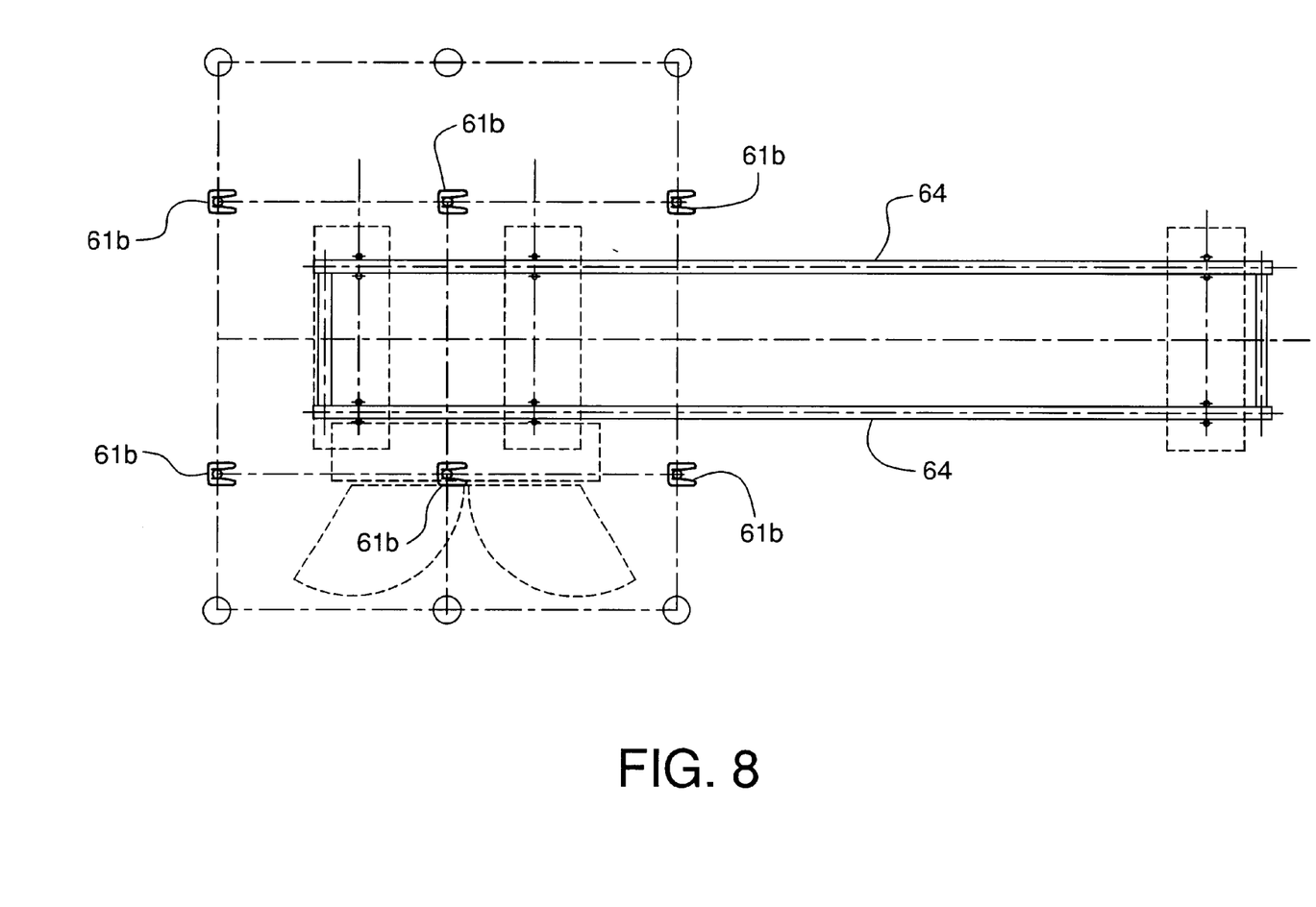
FIG. 8 a top view of a rail system of the circuit breaker of the present invention in an electrical substation.

Referring to FIG. 5 through FIG. 7, the electrical switching device further comprises wheels 63 attached to the base of the legs 51 on frame 50. In exterior substations, the equipment is typically placed on a gravel yard. To facilitate translation, the wheels 63 engage a rail system 64 or similar means. FIG. 8 provides a top view of a rail system that may be used with the present invention. In preferred embodiments, a pair of I-beams, which can be removed from the substation yard when not in use, can be used. Additional beams may be used to support the I-beams. The size of the I-beam must be suitable to provide rigid support of the device. The length of the I-beams must be at least 2 times the length of the device plus the distance between the first position and second position to provide sufficient electrical isolation for maintenance or repair. The distance between first position and second position is at least 30 inches multiplied by a factor, R, wherein the factor R is equal to 1, 2, 4, or 8 for 72 kV, 145 kV, 242 kV, or 362 kV devices, respectively.

The device can be translated through manual or automated means. Some means for translation of the device may include, but is not limited to, a pulley, winch, motor, or a system incorporating some or all of these components. FIG. 7 shows a winch 65 that is used to translate the device from first position to second position. Winch 65 may be mounted on the rail system 64 as shown or on frame 50. The winch can be manually or automatically operated.

Figure 9:
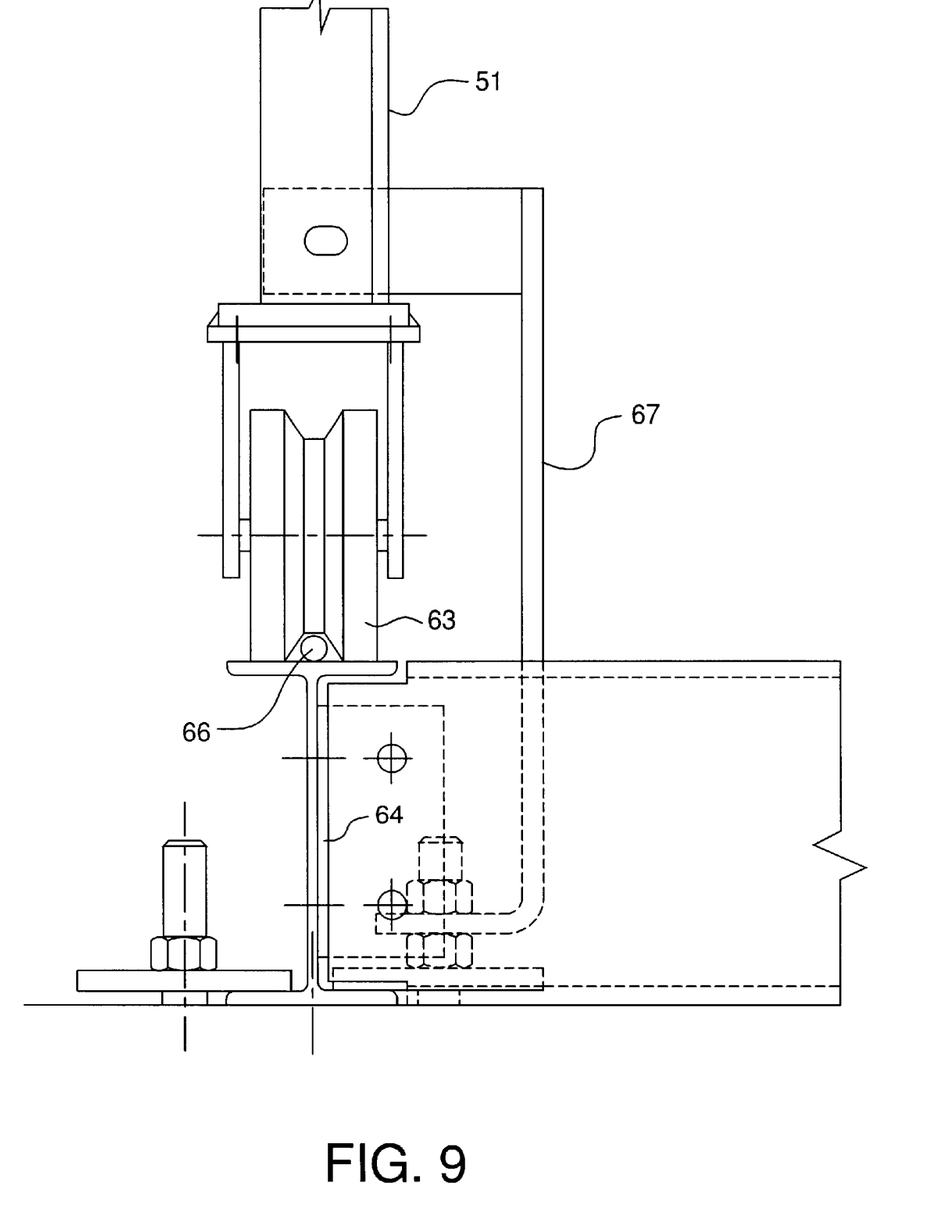
FIG. 9 provides a detailed side view of a wheel of one embodiment of the present invention.

FIG. 9 provides a side view of one embodiment of the present invention. In preferred embodiments, wheels 63 have V-grooves. These V-grooves on the wheel engage a metal dowel 66 that is disposed atop the I-beam. Other wheel configurations though may be selected without departing from the spirit of the present invention. Dowel 66 allows for the smooth translation and guidance of the device as it moves across rail 64. FIG. 9 further shows a foundation clamp 67 that locks or holds the device in the first position. The clamp 67 is shown as locking onto the rail 64. Other embodiments, however, may comprise a brake system that is mounted onto frame 50, or one or more wheels 63, to prevent movement of the device during operation.

The present invention is directed to parts and apparatuses, that include, but are not limited to, electrical switching devices, regardless of any specific description in the drawing or examples set forth herein. It will be understood that the present invention is not limited to use of any of the particular parts or assemblies discussed herein. Indeed, this invention can be used in any switching device. Further, the apparatus disclosed in the present invention can be used with the method of the present invention or a variety of other applications.

While the present invention has been particularly shown and described with reference to the presently preferred embodiments thereof, it will be understood by those skilled in the art that the invention is not limited to the embodiments specifically disclosed herein. Those skilled in the art will appreciate that various changes and adaptations of the present invention may be made in the form and details of these embodiments without departing from the true spirit and scope of the invention as defined by the following claims.

We claim:

1. A movable electrical switching device, said device comprising:
   a frame that includes one or more legs and supports one or more current interrupter tanks,
   a plurality of wheels that are attached to said one or more legs on the frame the wheels providing for motion of the frame along a generally horizontal axis,
   a plurality of bushings that extend upwardly from said one or more current interrupter tanks, said bushings further comprising a conductive end, and
   at least two disconnect switches that are connected to said conductive end of said bushings, said at least two disconnect switches being either at least two entrance disconnect switches or at least two exit disconnect switches, said disconnect switches disposed generally along the horizontal axis and increasing in height along the horizontal axis such that the switches are at increasing elevations.

2. The device of claim 1 wherein the wheels have V-shaped grooves.

3. The device of claim 1 wherein the wheels have a locking device.

4. The device of claim 1 wherein the wheels engage one or more rails.

5. The device of claim 4 wherein said rails are removable.

6. The device of claim 1 wherein the disconnect switches are connected to the conductive ends by jaw contacts.

7. The device of claim 1 wherein the frame further comprises a winch.

8. The device of claim 1, wherein the at least two disconnect switches comprises a first, second, and third disconnect switch, the second disconnect switch disposed horizontally between the first and third disconnect switches, the first disconnect switch at an elevation higher than the second disconnect switch, and the third disconnect switch at an elevation lower than the second disconnect switch.

9. The device of claim 1, wherein an axis of travel of the movable device is substantially perpendicular to an axis defined by the at least two disconnect switches.

10. An electrical switching device, said device comprising:
- a support frame comprised of a plurality of wheeled legs, a control cabinet, one or more tanks, and an operating mechanism, the support frame forming a translation axis;
- one or more circuit interrupters that are housed within the one or more tanks on said support frame, said one or more circuit interrupters comprising one or more bushings that extend upwardly from said one or more tanks, said one or more bushings having a conductive end; and
- a plurality of disconnect switches that are connected to said conductive end of said one or more bushings such that the elevation of said disconnect switches increases along the translation axis, said plurality of disconnect switches being either a plurality of entrance disconnect switches or a plurality of exit disconnect switches.

11. The device of claim 8 further comprising a pair of removable rails.

12. The device of claim 8 wherein said wheels have V-shaped grooves.

13. The device of claim 11 wherein said wheels engage the pair of rails such that the device translates horizontally.

14. The device of claim 8 wherein said wheels comprise a locking device.

15. The device of claim 8 wherein said frame further comprises a winch.

16. The device of claim 8 wherein the disconnect switches are connected to the conductive ends by jaw contacts.

17. An apparatus to convert high voltage power to low voltage power in an electrical substation, said apparatus comprising:
- a frame having a plurality of legs, each of said legs are terminated with wheels providing for axial translation from a first position at a first end of the translation axis wherein the apparatus is connected to an overhead bus and a second position at a second end of the translation axis wherein the apparatus is not connected to the overhead bus,
- one of more circuit interrupter tanks mounted atop of said frame,
- two or more bushings that extend upwardly from said one or more tanks whereby each of the bushings has a conductive end, and
- two or more disconnect switches that connect the conductive ends of said two or more bushings to the overhead bus, said two or more disconnect switches being either two or more entrance disconnect switches or two or more exit disconnect switches, the two or more disconnect switches disposed generally along the translation axis, the two or more disconnect switches increasing in height from the first end of the translation axis.

18. The device of claim 17 wherein the wheels have V-shaped grooves.

19. The device of claim 17 wherein the wheels have a locking device.

20. The device of claim 17 wherein the wheels engage one or more rails.

21. The device of claim 17 wherein said rails are removable.

22. The device of claim 17 wherein the disconnect switches are connected to the conductive ends of the bushings by jaw contacts.

23. The device of claim 17 wherein the disconnect switches are connected to the overhead bus by jaw contacts.

24. A electrical switching device capable of translation along a translation axis from a first position to a second position, said device comprising:
- a frame that comprises one or more legs wherein said legs further have a plurality of wheels attached thereto,
- one or more circuit interrupter tanks disposed atop said frame,
- a plurality of bushings that extend upwardly from said one or more current interrupter tanks, said bushings further comprising a conductive end, and
- at least two or more disconnect switches that are connected to said conductive end of said bushings, said at least two or more disconnect switches being either at least two or more entrance disconnect switches or at least two or more exit disconnect switches, the at least two or more disconnect switches disposed generally along the translation axis, said disconnect switches are increasing in height along the translation axis such that the electrical switching device may translate from the first position to the second position without interference.

25. The device of claim 24 further comprising a pair of rails.

26. The device of claim 24 wherein the wheels have a locking device.

27. The device of claim 24 wherein the frame further comprises a winch.

28. The device of claim 24 wherein the distance between the first position and the second position is at least about thirty inches multiplied by the factor R, whereby R is equal to 1, 2, 4, or 8.

* * * * *

UNITED STATES PATENT AND TRADEMARK OFFICE
CERTIFICATE OF CORRECTION

PATENT NO. : 6,630,638 B1  
DATED : October 7, 2003  
INVENTOR(S) : Freeman et al.

Page 1 of 1

It is certified that error appears in the above-identified patent and that said Letters Patent is hereby corrected as shown below:

Title page,
Item [56], References Cited, OTHER PUBLICATIONS,
1st reference, please delete "$^{TM}$" and insert therefor -- ® --.
3rd reference, please delete "http://www.elecworld.com/cir_brk.html" and insert therefor -- http://www.elecworld.com/circ_brk.html --.
4th reference, please delete "http://www.spectrant.ca/connectors/sub.htm" and insert therefor -- http://www.spectranet.ca/connectors/subs.htm --.
9th reference, please delete "http://www.elecworld.com/circ_brk.htm" and insert therefor -- http://www.elecworld.com/circ_brk.html --.
12th reference, please delete "pp. 1-." and insert therefor -- pp. 1-8. --.
16th reference, please delete "Disconnec" and insert therefor -- Disconnect --.
19th reference, please delete "Powe" and insert therefor -- Power --.
22nd reference, please delete "TTTR8" and insert therefor -- TTR8 --.

Column 8,
Line 27, please delete "A" and insert therefor -- An --.

Signed and Sealed this

Second Day of March, 2004

JON W. DUDAS  
*Acting Director of the United States Patent and Trademark Office*